United States Patent

Oster et al.

[11] Patent Number: 5,960,153
[45] Date of Patent: Sep. 28, 1999

[54] FLICKER SUPPRESSION IN A DIGITAL CAMERA RECORDING SYSTEM

[75] Inventors: Jan Oster, Copenhagen S; Niels V. Knudsen, Hellerup, both of Denmark

[73] Assignee: Phase One Denmark A/S, Frederiksberg, Denmark

[21] Appl. No.: 08/669,085

[22] Filed: Jun. 25, 1996

[30] Foreign Application Priority Data

Jun. 26, 1995 [DK] Denmark ........................................ 0737

[51] Int. Cl.⁶ .............................. H04N 5/225; H04N 5/91
[52] U.S. Cl. ............................................ 386/117; 386/107
[58] Field of Search ..................................... 386/117, 118, 386/38, 107, 119; 348/222, 223, 227, 229, 362, 370; H04N 5/225, 5/91

[56] References Cited

U.S. PATENT DOCUMENTS

| | | |
|---|---|---|
| 4,460,836 | 7/1984 | Tsunekawa et al. . |
| 4,495,415 | 1/1985 | Kawabata . |
| 4,774,588 | 9/1988 | Noda et al. . |
| 4,918,538 | 4/1990 | Saito et al. ............................... 386/117 |
| 5,293,238 | 3/1994 | Nakano et al. . |
| 5,294,990 | 3/1994 | Aoki ........................................ 386/117 |
| 5,485,201 | 1/1996 | Aoki et al. ............................... 348/223 |

FOREIGN PATENT DOCUMENTS

| | | |
|---|---|---|
| 0506031A1 | 9/1992 | European Pat. Off. . |
| 3833823C1 | 10/1988 | Germany . |
| 2175172 | 11/1986 | United Kingdom . |
| 9204799 | 3/1992 | WIPO . |

*Primary Examiner*—Robert Chevalier
*Attorney, Agent, or Firm*—Jones Volentine, L.L.P.

[57] ABSTRACT

An image recording system comprising an electronic camera and an image recording method are provided by which influence of a recorded image of temporal fluctuations in intensity of light illuminating objects to be recorded is significantly reduced so that use of inexpensive light sources for illumination of the objects is possible.

24 Claims, 3 Drawing Sheets

FLICKER SUPPRESSION IN A DIGITAL CAMERA RECORDING SYSTEM

FIELD OF THE INVENTION

The present invention relates to an image recording method of an image recording system comprising an electronic camera for control of illumination uniformity of a recorded image of illuminated objects and an image recording system utilizing this method.

BACKGROUND OF THE INVENTION

Replacement of conventional cameras for photographing and recording still images by use of the photosensitivity of photographic films by electronic cameras has gained increasing attention in recent years.

An electronic camera uses a solid state imaging device, typically a charge coupled device (CCD), for recording of an image. The CCD is an array of a large number of light sensitive elements connected to each other as an analog shift register. In each element of the CCD a charge is formed that is proportional to the light energy incident on the element during an integration period. The analog charge of each element is shifted serially out of the CCD and are typically converted to digital values whereby a digital representation of the recorded image is formed. The digitized image is either transferred to an external computer through a computer interface or is stored on a memory card or on a rotating magnetic recording medium in the camera.

It is well known to use linear CCDs in electronic cameras, in which the light-sensing elements are arranged in a single line. Typically, the array is moved across the image, scanning it one line at a time. For color images, filters can be placed in front of the array, which then makes three passes across the image during image recording.

Offering a good compromise of image resolution (high pixel count) and cost in electronic cameras, is the trilinear CCD array, which comprises three linear CCDs positioned side by side. Each line is covered by its own color filter, typically in the form of dye that is painted over the elements. The array makes a single pass across the image, and each linear CCD records a line at a time. Typically, an image is recorded in this way in 1 to 10 minutes.

At a higher cost, a rectangular CCD array can capture the entire image in a very short time. Three separate exposures with three color filters are needed to make a color photo. One way to do this is to place the filters in a rotating color wheel that sequentially inserts each color filter in the optical path between the image forming optics of the electronic camera and the rectangular CCD array.

It is known to mount the circuitry of a digital carriers in a camera back (sometimes denoted a digital camera back) that attaches like a film holder to a conventional camera.

SUMMARY OF THE INVENTION

Lighting is a crucial element in any form of photography and lighting is one of the key points of differentiation among digital cameras, and because lights are among the costliest tools of the trade, the differences are significant.

The long time needed to record an image with an electronic camera is a major disadvantage of presently known cameras at the above-mentioned type. Highly stabilized and expensive light sources are needed to ensure a temporal uniform illumination of the objects to be recorded by the camera during the recording period. A fluctuating light source may cause different areas of the recorded image to be recorded at different intensity levels of the illuminating light, for example in an image recorded line by line, the lines may show up. For a photographer who already has an investment in one kind of lighting, the cost of new lights is a significant factor to consider when purchasing a new camera.

It is an object of the present invention to provide a new image recording system comprising an electronic camera and an image recording method by which influence of temporal fluctuations in intensity of light illuminating the objects is significantly reduced compared to known systems and methods thereby enabling the use of inexpensive light sources for illumination of objects to be recorded with an electronic camera.

According to the invention the above-mentioned object is fulfilled by providing an image recording method for recording of an image of objects illuminated by light incident upon them by an image recording system comprising an electronic camera, the method comprising synchronizing the recording of the image with intensity fluctuations of the illuminating light whereby the image is recorded as if the objects were illuminated with light of a temporally substantially constant light intensity, and an image recording system comprising an electronic camera and synchronizing means for synchronizing recording of an image of illuminated objects with intensity fluctuations of light that illuminates the objects to be recorded so that the image is recorded as if the objects were illuminated with light of a temporally substantially constant light intensity.

It is a main aspect of the present invention that recording of an image is synchronized with temporal fluctuations in light intensity in such a way that influence of temporal objects is significantly reduced compared to known systems and methods.

This reduction is obtained by controlling the recording of the image in such a way that each part of the objects to be recorded is illuminated by substantially the same quantity of light energy as other parts of the objects during exposure of the corresponding parts of the image.

The image may be recorded using a solid state imaging device, such as a CCD. Each light sensitive element of the CCD integrates the intensity of the light incident upon it during an integration period and accumulates a charge in it that is proportional to the integrated light intensity. Until start of the integration of light intensity, the element is short-circuited so that the charge is zero at the start of the integration period.

The illuminating light may be generated by any artificial or natural light source, such as lamps of the light bulb type, such as tungsten lamps, etc., arc lamps, such as metal-vapour lamps, etc., fluorescent tubes, such as high-frequency fluorescent tubes, household fluorescent tubes, etc., strobe lamps, flash lights, sun light, etc.

In the present context, the term exposure is to be understood in a broad sense as the time period during which a light sensor is actually sensing the light. For example, a photographic film is exposed to light whenever light is incident upon it, while a CCD is exposed to light when the elements of the CCD are allowed to integrate light incident upon them. The CCD is not exposed when the light sensing elements are short-circuited although light may be incident upon them.

Synchronization of image recording with fluctuations of illumination of the objects to be recorded may be performed by synchronizing the integration periods of the CCD elements with these fluctuations.

The synchronization may be performed by starting and/or stopping the integration period at specific predetermined intensity levels of the illuminating.

For example, when image recording is dons with an electronic camera having a rectangular CCD array and a flash for illumination of the objects to be recorded, the synchronization of the three exposures needed to make a color photo may be performed by starting the integration period of the rectangular CCD array at a specific predetermined intensity level of the illuminating flash light.

If the fluctuations are periodical, the integration may take place over a large number of periods, such as from 1 to 10 periods, preferably 2 to 10 periods, most preferred 2 to 5 periods, such as 2 to 3 periods, e.g. 2 periods. When the light intensity is integrated over an integer number of periods of the light fluctuations, the integrated light intensity will be constant and, thus, independent of the position of the integration period in relation to the fluctuation period.

For both periodically and non-periodically varying light intensity of the illuminating light, synchronization may be performed by determination of light energy incident upon the objects during exposure of a part of the image, e.g. by integration of the monitored light intensity continuously or at appropriate time intervals, and stopping exposure of the part of tile image upon determination of a specific light energy level so that each part of the objects is illuminated by substantially the same quantity of light energy as other parts of the objects during exposure of the corresponding parts of the image.

For example, when recording a color image with a flash-light and a digital camera having a rectangular CCD for capturing the entire image with three separate exposures with three color filters, utilization of the above-mentioned method ensures uniform exposure of each of the colors of the image. In this example, a part of the image is the entire image.

Alternatively, the synchronization may be performed by starting the exposure period at a specific predetermined time in relation to the fluctuation period so that the resulting amount of recorded light intensity is independent of the fluctuations.

Synchronization may also be performed in relation to any signal that corresponds to the intensity of light incident on the objects to be recorded.

Such a signal may be generated by a light sensitive device detecting light emitted from one or more light sources illuminating the objects to be recorded or detecting light reflected from the objects. Tie light sensitive device may be positioned inside the electronic camera and it may comprise a solid state imaging device. The solid state imaging device may be used for both image recording and for monitoring of light intensity.

Alternatively, such a signal may be derived from a power source of a light source. For example, some light sources supplied from the mains supply lines generate light that flicker at twice the mains frequency. A signal, e.g. from a transformer connected to the mains voltage, that is proportional to the mains voltage can be used for synchronization as described above.

Synchronization may also be performed by synchronously measuring the intensity of light emitted from the light sources illuminating the objects to be recorded during the exposure periods and after recording modifying the values of recorded light intensities of the image in accordance with synchronously measured light intensity to generate modified values that are substantially independent of fluctuations of intensity of the illuminating light. The modified values may be generated by multiplication of the recorded values by a constant proportional to the reciprocal value of the measured emitted light energy during the exposure period either in an analog multiplier before analog to digital conversion of the charge values or in a digital multiplier after analog to digital conversion.

Further, in the method of compensating for light intensity fluctuations described in the previous section, measurement of light intensity fluctuations can be substituted by detection in the recorded image of light intensity fluctuations, e.g. by doing a frequency analysis on the recorded image, thereby using calculated values of light intensity fluctuations in stead of measured values to produce modified values of recorded light intensity of the image.

For example, as described earlier, the trilinear CCD array comprises three linear CCDs positioned side by side. Each line is covered by its own color filter. When recording an image, the array makes a single pass across the image, and each linear CCD records a line at a time. Thus, during the pass across the image, a time-varying intensity fluctuation of the illuminating light is converted, due to the movement of the CCD, into a spatial variation of recorder light intensity in the image. The corresponding spatial frequency may be determined by a spatial frequency analysis of the recorded image. Further, cross-correlation of the recordings of each of the three lines may be utilized for determination of intensity variations of the illuminating light as such variations give rise to corresponding spatial variations of the recordings by each of the lines, however, displaced in relation to each other because of the different positions of the lines in the CCD array. Thus, cross-correlation between the three recordings of the lines may separate the identical spatial variations in recorded intensities caused by fluctuations in the intensity of the illuminating light from the spatial variations causes by the objects recorded.

In a presently preferred embodiment of the invention, the exposure periods are set to be an integer number of half periods of the mains frequency, such as an integer number of 10 ms periods in Europe, an integer number of 8.33 ms periods in USA, etc. whereby it is ensured that the exposure period is set to be equal to an integer number of light intensity fluctuation periods.

The main frequency may be determined from a measurement of the line voltage, an intensity measurement of the illuminating light, a detection of a beat frequency in the recorded image, or from another parameter of the image recording system that can be utilized as an indicator of the mains frequency, such as the language version utilized by the operator of the system, e.g. German language indicates a 50 Hz mains frequency and US language indicates 60 Hz mains frequency.

An exemplary embodiment of the invention will now be described with reference to the accompanying drawings.

DETAILED DISCLOSURE OF THE INVENTION

Figure 1:
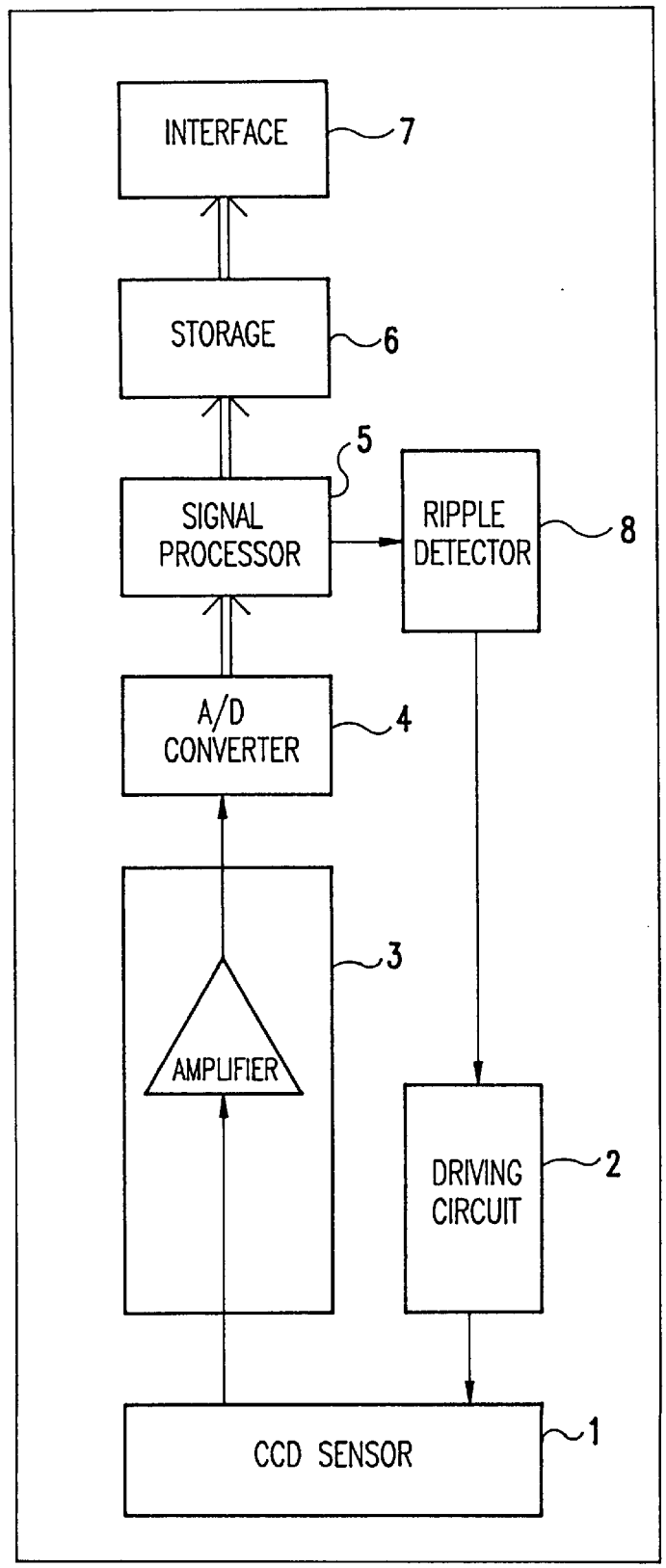
FIG. 1 is a diagram schematically showing the construction of an electronic camera according to the present invention.

FIG. 1 is a schematic block diagram showing a digital camera or digital camera back according to the present invention, in which a CCD sensor (1), a trilinear CCD is presently preferred because of its advantageous cost/performance ratio, converts a image of an object into an analog color signal. The CCD sensor (1) is controlled by a driving circuit (2), e.g. for starting of the integration (exposure) period, shifting out of the accumulated charges, etc. The analog output signal from the CCD sensor (1) is routed to an analog amplifier (3) that converts the output signal to a signal compatible with the analog to digital converter (4). The digital output values from the A/D converter (4) represent a digitized version of the recorded image. They are routed to a signal processor (5) that transfers the digital values, with or without modifications, received from the A/D converter to an image storage (6) and finally the image is transferred to a computer (not shown) through the interface (7).

A ripple detector (8) detects the period of light fluctuations and controls the integration period of the CCD sensor in such a way that the integration period equals an integer number of fluctuation periods.

The fluctuation period may be determined by any known frequency determination method, such as determination of zero-crossing period, determination of distance between signal maxima, Fourier transformation, determination of frequency content at specific frequencies, etc.

To determine the fluctuation period, the trilinear array may be kept in a fixed position for a period before scanning of an image during which the period of the fluctuations of the illuminating light is determined by measurement of integrated light intensity for different integration periods.

For example when the fluctuations of the illuminating light intensity are periodical, the integration period is set to a specific value (e.g. 10 ms corresponding to a 50 Hz line frequency) and the standard deviation of the resulting integrated light intensity for a set of exposures with the trilinear array in a fixed position is determined. This is repeated for a set of specific values of the integration period (e.g. 8.3 ms corresponding to a 60 Hz line frequency) and the integration period resulting in the lowest standard deviation is selected to be the period of the light intensity fluctuations.

Figure 2:
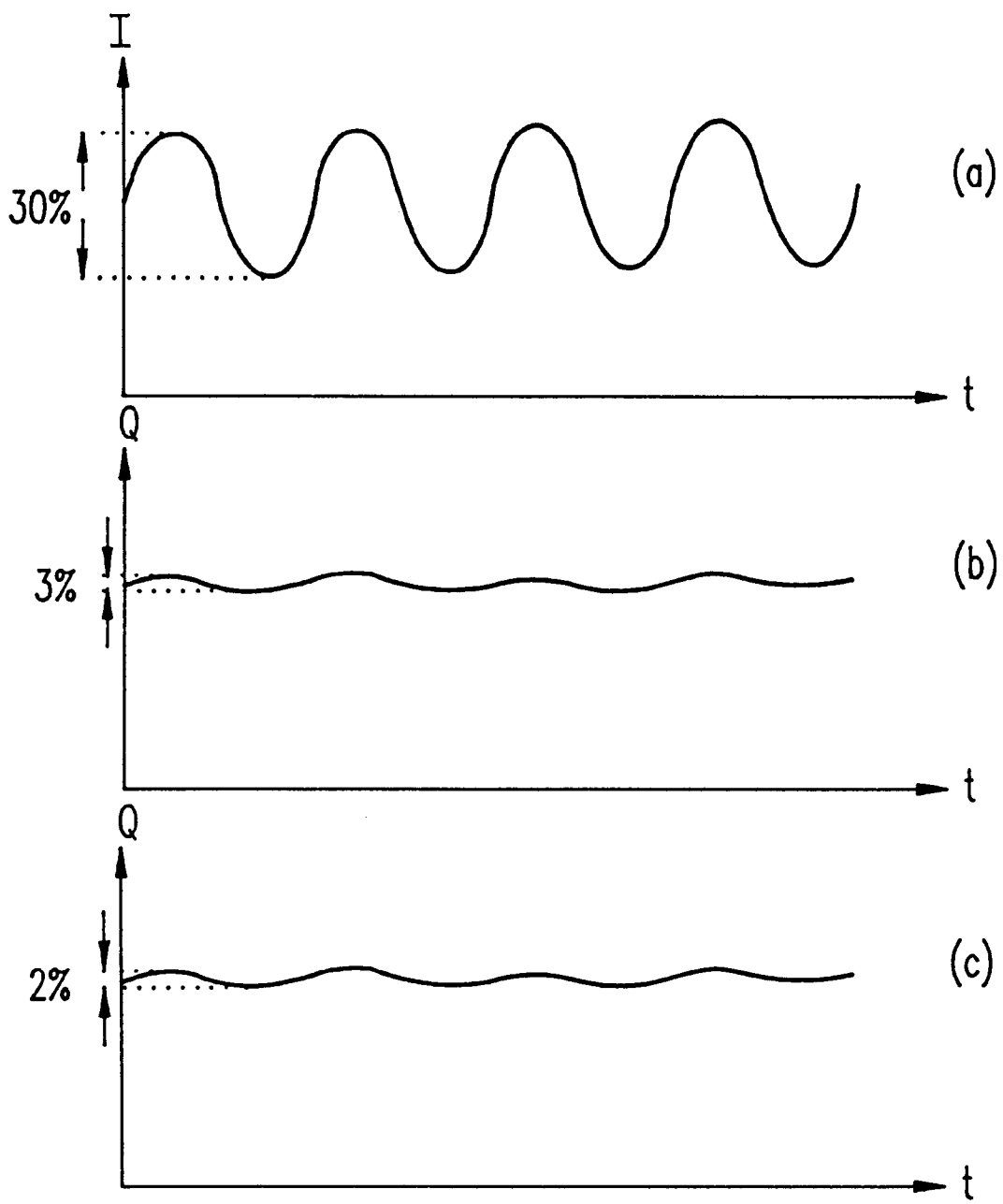
FIG. 2 shows a plot (a) of measured light fluctuations and plots (b), (c) of corresponding fluctuations of recorded light intensities when the exposure period equals an integer number of periods of the light fluctuations.

FIG. 2 shows a plot (a) of measured light intensity (I) fluctuations as a function of time (t) of an ordinary house hold lamp with a light bulb. The plots (b), (c) shows fluctuations of integrated light intensities (Q) when the integration period is 10 ms and 20 ms respectively. It is seen that the fluctuations of the light source are reduced by a factor of ten from 30% to 3% when the integration period is 10 ms corresponding to one halt period of the 50 Hz mains frequency. When the integration period is 20 ms (two times a half period) the fluctuations are further reduced to 2%. A human is able to detect light fluctuations of a recorded image down to 2–3%.

Figure 3:
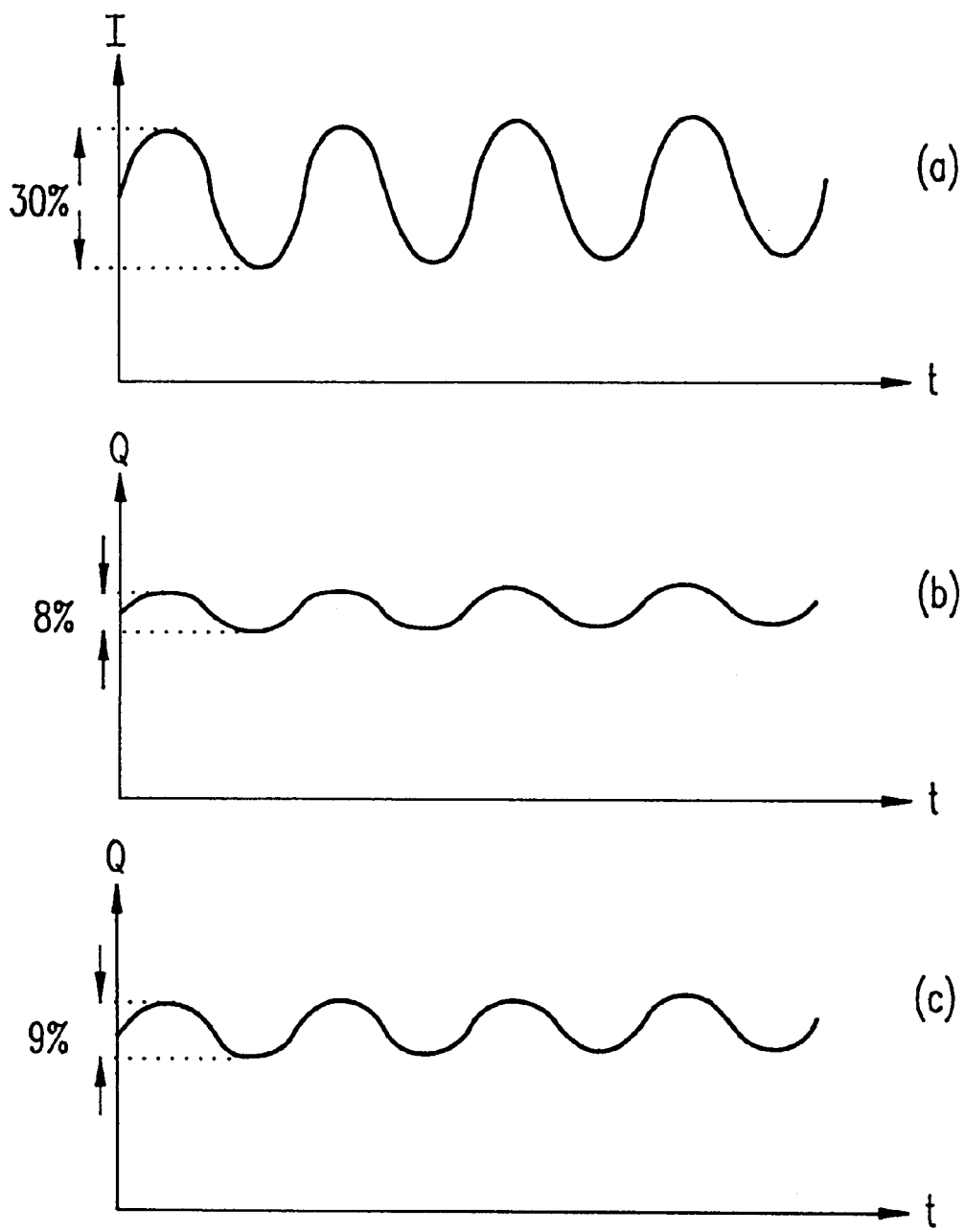
FIG. 3 shows a plot (a) of measured light fluctuations and plots (b), (c) of corresponding fluctuations of recorded light intensities when the exposure period is different from an integer number of periods of the light fluctuations.

FIG. 3 shows a plot (a) of measured light intensity (I) fluctuations identical to FIG. 2 (*a*). The plots (b), (c) show fluctuations of integrated light intensities (Q) when the integration period is different (8.3 ms and 16.7 ms) from an integer number of periods of the light intensity (I) fluctuations. The fluctuations shown are significantly larger than the fluctuations shown, in FIGS. 2 (*b*) and (*c*).

We claim:

1. An image recording system comprising:
    an electronic camera with a solid state imaging device that is moved across the image during image recording, for successively recording various parts of the image with the imaging device;
    synchronizing means for synchronizing each recording of a part of the image with intensity fluctuations of light that illuminates the objects so that each part of the image is recorded as if the objects were illuminated with light of a substantially temporally constant light intensity; and
    processing means for modifying light intensities of each recording of the image in accordance with a monitored illuminating light intensity so that modified light intensities of the recorded image are substantially independent of the intensity fluctuations of the illuminating light, said processing means comprising
        means for forming a reciprocal value that is proportional to the reciprocal value of the illuminating light monitored during recording of the intensities to be modified, and
        a multiplier which multiplies recorded intensities of the recorded image with the reciprocal value to form modified intensities of the recorded image.

2. An image recording system comprising an electronic camera, synchronizing means for synchronizing recording of an image of illuminated objects with intensity fluctuations of light that illuminates the objects to be recorded so that the image is recorded as if the objects were illuminated with light of a temporarily substantially constant light intensity and processing means for modifications of values of recorded light intensities of the recorded image in accordance with the monitored illuminating light intensity so that modified intensity values of the recorded image are generated that are substantially independent of fluctuations of intensity of the illuminating light, said processing means comprises multiplier means for generation of modified intensity values of the recorded image and means for forming a reciprocal value that is proportional to the reciprocal value of the illuminating light energy monitored during recording of the intensity values to be modified, the multiplier means generating the modified values by multiplication of recorded intensity values of the recorded image with the reciprocal value.

3. An image recording method for recording of an image of objects illuminated by light incident upon them by an image recording system comprising an electronic camera with a solid state imaging device, the method comprising composing the image from separate exposures of the objects, a selected color filter being inserted into the optical path of the electronic camera during each exposure and synchronizing the recording of the image with intensity fluctuations of the illuminating light whereby separate exposures of the image are recorded as if the objects were illuminated with light of a substantially temporally constant light intensity.

4. An image recording system for recording of an image of illuminated objects, comprising an electronic camera with a solid state imaging device, a plurality of color filters, one of which is selectively inserted into the optical path of the electronic camera during corresponding separate exposures of the image, and synchronizing means for synchronizing recording of the image with intensity fluctuations of light that illuminates the objects to be recorded so that separate exposures of the image are recorded as if the objects were illuminated with light of a substantially temporally constant light intensity.

5. The method according to claim 3, comprising monitoring the intensity of light received from the illuminated objects and synchronizing the recording of he image and fluctuations in monitored light intensity.

6. The method according to claim 3, comprising monitoring an energy supply to a light source for generation of illuminating light of the objects to be recorded and synchronizing the image recording of the objects and fluctuations in monitored energy.

7. The method according to claim 3, comprising supplying energy for the illuminating light sources from a power supply that is connected to mains supply lines operating at a mains voltage and a mains frequency, monitoring of the mains voltage, and synchronizing image recording to the mains voltage.

8. The method according to claim 3, comprising starting exposure of the image recording means of the electronic camera at a specific time in the fluctuation period of the illuminating light.

9. The method according to claim 3, comprising determining the light energy incident upon the objects during exposure of a part of the image and stopping exposure of the part of the image upon determination of a specific light energy level.

10. The method according to claim 3, comprising exposure of the image recording means of the electronic camera during an integer number of periods of the fluctuation of the illuminating light.

11. The method according to claim 7, comprising adjustment of a selected exposure period to an integer number of half periods of the mains frequency.

12. The method according to claim 3, comprising measuring of the intensity of illuminating light sources during recording of the image and modification of values of light intensities of the recorded image in accordance with the measured illuminating light intensity whereby modified intensity values are generated that are substantially independent of fluctuations of intensity of the illuminating light sources.

13. The method according to claim 12, wherein modified values are generated by multiplication of intensity values of the recorded image with the reciprocal value of the illuminating light energy measured during recording of the intensity values in question.

14. The method according to claim 12, further comprising measurement of light intensity fluctuations of the illuminating light by detection in the recorded image of light intensity fluctuations.

15. A system according to claim 4, comprising monitoring means for monitoring the intensity of light received from the illuminated objects and wherein the synchronizing means synchronizes the recording of the image with fluctuations in monitored light intensity.

16. A system according to claim 15, wherein the monitoring means comprises energy monitoring means for monitoring an energy supply to a light source for generation of illuminating light of the objects to be recorded and the synchronizing means synchronizes the image recording of the objects with fluctuations in monitored energy.

17. A system according to claim 16, wherein energy for the light sources are supplied from a power supply that is connected to mains supply lines operating at a mains voltage and a mains frequency, the energy monitoring comprise mains monitoring means for monitoring of the mains voltage, and the synchronizing means synchronizes image recording with the mains voltage.

18. A system according to claim 4, comprising exposure control means for starting exposure of the image at a specific time in the fluctuation period of the illuminating light.

19. A system according to claim 4, comprising energy determination means for determination of light energy incident upon the objects during exposure of a part of the image and first timing means for stopping exposure of the part of the image upon determination of a specific light energy level.

20. A system according to claim 18, wherein the exposure control means comprises second timing means for controlling that the duration of exposure of the image equals an integer number of periods of the fluctuation of the illuminating light.

21. A system according to claim 17, comprising adjustment means for adjustment of a selected exposure period to an integer number of half periods of the mains frequency.

22. A system according to claim 14, comprising processing means for modification of values of recorded light intensities of the recorded image in accordance with the monitored illuminating light intensity so that modified intensity values of the recorded image are generated that are substantially independent of fluctuations of intensity of the illuminating light.

23. A system according to claim 22, wherein the processing means comprises multiplier means for generation of modified intensity values of the recorded image and means for forming a reciprocal value that is proportional to the reciprocal value of the illuminating light energy monitored during recording of the intensity values to be modified, the multiplier generating the modified values by multiplication of recorded intensity values of the recorded image with the reciprocal value.

24. A system according to claim 22, further comprising detection means for detection in the recorded image of light intensity fluctuations of the illuminating light for generation of measured illuminating light intensity values.

* * * * *